(12) United States Patent
Cattaneo

(10) Patent No.: US 11,096,489 B2
(45) Date of Patent: Aug. 24, 2021

(54) FRONT ADJUSTMENT SYSTEM FOR LEVELING FEET FOR FURNITURE

(71) Applicant: Leonardo S.r.l., Figino Serenza (IT)

(72) Inventor: Carlo Cattaneo, Figino Serenza (IT)

(73) Assignee: Leonardo S.r.l., Figino Serenza (IT)

( * ) Notice: Subject to any disclaimer, the term of this patent is extended or adjusted under 35 U.S.C. 154(b) by 27 days.

(21) Appl. No.: 16/479,923

(22) PCT Filed: Feb. 12, 2018

(86) PCT No.: PCT/EP2018/053417
§ 371 (c)(1),
(2) Date: Jul. 23, 2019

(87) PCT Pub. No.: WO2018/149782
PCT Pub. Date: Aug. 23, 2018

(65) Prior Publication Data
US 2019/0387882 A1 Dec. 26, 2019

(30) Foreign Application Priority Data
Feb. 15, 2017 (IT) .......................... 102017000016799

(51) Int. Cl.
*A47B 91/02* (2006.01)
*A47B 97/00* (2006.01)
(Continued)

(52) U.S. Cl.
CPC ............ *A47B 91/028* (2013.01); *A47B 97/00* (2013.01); *A47B 2220/0027* (2013.01);
(Continued)

(58) Field of Classification Search
CPC combination set(s) only.
See application file for complete search history.

(56) References Cited

U.S. PATENT DOCUMENTS 4,991,805 A * 2/1991 Solak ...................... F16M 7/00
248/188.4
5,398,620 A * 3/1995 Rouch ...................... F16M 7/00
108/1
(Continued)

FOREIGN PATENT DOCUMENTS

EP 2653068 10/2013
EP 2839761 2/2015
(Continued)

OTHER PUBLICATIONS

International Search Report and the Written Opinion dated Mar. 5, 2018 From the International Searching Authority Re. Application No. PCT/EP2018/053417. (10 Pages).

*Primary Examiner* — Monica E Millner

(57) ABSTRACT

A compact front adjustment system for leveling feet for furniture (M) with a bottom (12) and shoulders (11), comprising: at least two front feet, a right foot (13d) and a left foot (13s) and at least two rear feet, a right foot (14d) and a left foot (14s), wherein each of said rear feet (14d,14s) comprises an adjustment mechanism in height, which is accessible from outside the foot through respective holes (21d,21s) and which can be maneuvered by means of a maneuvering tool (18). According to the invention, a respective supporting and guiding unit (17d,17s; 22; 25) for said maneuvering tool (18) is provided in combination with said rear feet (14d,14s), said unit being assembled on said bottom (12) of the furniture (M) in an intermediate position between said front feet (13d,13s) according to an axis X which is aligned with said holes (21d,21s) for access to the adjustment mechanism in height of the respective rear foot (14d, 14s).

5 Claims, 3 Drawing Sheets

(51) Int. Cl.
 *A47L 15/42* (2006.01)
 *D06F 39/12* (2006.01)
 *F16M 7/00* (2006.01)

(52) U.S. Cl.
 CPC ......... *A47L 15/4253* (2013.01); *D06F 39/125* (2013.01); *F16M 7/00* (2013.01)

(56) References Cited

U.S. PATENT DOCUMENTS

| | | | |
|---|---|---|---|
| 10,638,839 B2 * | 5/2020 | Cattaneo | A47B 91/028 |
| 2007/0205342 A1 * | 9/2007 | Gabriel | F16M 7/00 248/188.4 |
| 2018/0368574 A1 * | 12/2018 | Cattaneo | A47B 91/028 |
| 2019/0116976 A1 * | 4/2019 | Cattaneo | A47B 91/02 |
| 2019/0281981 A1 * | 9/2019 | Cattaneo | A47B 91/028 |
| 2020/0196756 A1 * | 6/2020 | Cattaneo | A47B 91/028 |

FOREIGN PATENT DOCUMENTS

| | | | | |
|---|---|---|---|---|
| EP | 2839761 A1 * | 2/2015 | | A47B 91/028 |
| JP | 63-025039 | 2/1988 | | |

* cited by examiner

FRONT ADJUSTMENT SYSTEM FOR LEVELING FEET FOR FURNITURE

RELATED APPLICATIONS

This application is a National Phase of PCT Patent Application No. PCT/EP2018/053417 having International filing date of Feb. 12, 2018, which claims the benefit of priority of Italian Patent Application No. 102017000016799 filed on Feb. 15, 2017. The contents of the above applications are all incorporated by reference as if fully set forth herein in their entirety.

FIELD AND BACKGROUND OF THE INVENTION

The present invention relates to an improved front adjustment system for leveling feet for furniture.

The invention is particularly suitable for effecting the adjustment of rear feet applied to the bottom of the furniture, such as, for example, in kitchen bases, where the distance between the bottom and the floor is minimal and limited, with difficulty of front access to the rear feet of the system.

Various leveling systems are known, which, moreover, involve the provision and assembly of special transmission rods and adjustment of the rear feet.

Due to the minimum distance between the bottom of the furniture and the floor, it is, in fact, impossible to act accurately and rapidly with a screwdriver or tool that reaches the rear feet. The considerable distance and minimum space available create the difficulty of gaining access to the holes or adjustment devices of the rear feet. This leads to the need for guides and extension rods controlled by a screwdriver or similar tool that are guided towards the specific seat of the rear foot. This difficulty is overcome by the arrangement of transmission rods, for example, within appropriate guides constrained to the bottom of the piece of furniture, as described for example in EP 2839761.

These transmission rods are consequently suitably supported in specific separate tubular elements, fixed to the bottom of the furniture, which keep them in a guided position and allow the adjustment of the rear feet with a normal screwdriver or tool.

The presence of separate supports, but adjacent to the foot, implies that the same, in order to be installed and reach the feet, must be tilted with respect to both the actuation and the foot creating difficulty in actuation.

Alternatively, feet are currently provided in plaques or attachments for supporting the feet, whereby said plaques are provided with specific passages and housings designed for accommodating the above-mentioned transmission rods towards the rear feet, as disclosed, for example, in Italian patent application MI2011A001872.

If in this case, the separate supports of the transmission rods, the supporting plaques of the front feet must in any case provide passages and housings for the transmission rods.

Furthermore, the distances necessary for the arrangement of the various parts must be predicted exactly, not always the same, depending on the application.

The elements involved are therefore not only attachments or supporting plates for the feet, but also transmission rods that entail both manufacturing and assembly costs.

Consequently, in the known art, either numerous elements are necessary for forming and actuating the adjustment system of the rear feet, or complex plaques or supporting attachments for the front feet must be provided with relative rods positioned in the same for being able to eliminate the supports of the transmission rods.

It should also be noted that not all adjustable feet are provided with these separate attachment plaques, but an integrated attachment can be provided, consequently attempting to effect the adjustment in the presence of any type of foot used.

Other adjustment systems are illustrated in patents AU2009227484A1 and WO2010/020633A1 and in Italian patent application 102016000024683.

Italian patent application 102016000024683 describes a compact front adjustment system for leveling feet of furniture (M) with a bottom (12) and shoulders (11), of the type comprising, in combination: at least one front foot (13, 26, 127) and at least one rear foot (16, 27), wherein at least said rear foot (16, 27) comprises an adjustment mechanism in height that is accessible from outside the foot and can be operated by means of a tool (22, 48, 123). Said at least one front foot (13, 26, 127) provides a pass-through hole (20, 41, 41', 141', 42, 43) for said adjustment tool of said at least one rear foot (16, 27), wherein said pass-through hole acts as support and guide for said tool.

This type of adjustment system has given excellent results but, above all for some applications, it is relatively costly.

SUMMARY OF THE INVENTION

The general objective of the present invention is to provide a front adjustment system for rear leveling feet for furniture which is particularly simplified with respect to systems currently known, and therefore very economical.

A further objective of the present invention is to provide a front adjustment system for rear leveling feet for furniture in which the space beneath the bottom is extremely limited with serious difficulties of access.

Another objective of the invention is to provide an adjustment system which is suitable for the various configurations of rear feet used for leveling the piece of furniture.

Yet another objective is to provide a front adjustment system for rear leveling feet for furniture that does not provide any transmission rod for actuating the adjustment of the rear feet of the furniture.

The above objectives are achieved by a system having the features indicated in the enclosed claim 1 and the subclaims.

BRIEF DESCRIPTION OF THE SEVERAL VIEWS OF THE DRAWINGS

The structural and functional characteristics of the invention, and its advantages with respect to the known art, will appear evident from the following description, referring to the attached drawings, which illustrate various non-limiting embodiments of the invention itself.

In the drawings.

DESCRIPTION OF SPECIFIC EMBODIMENTS OF THE INVENTION

Figure 1:
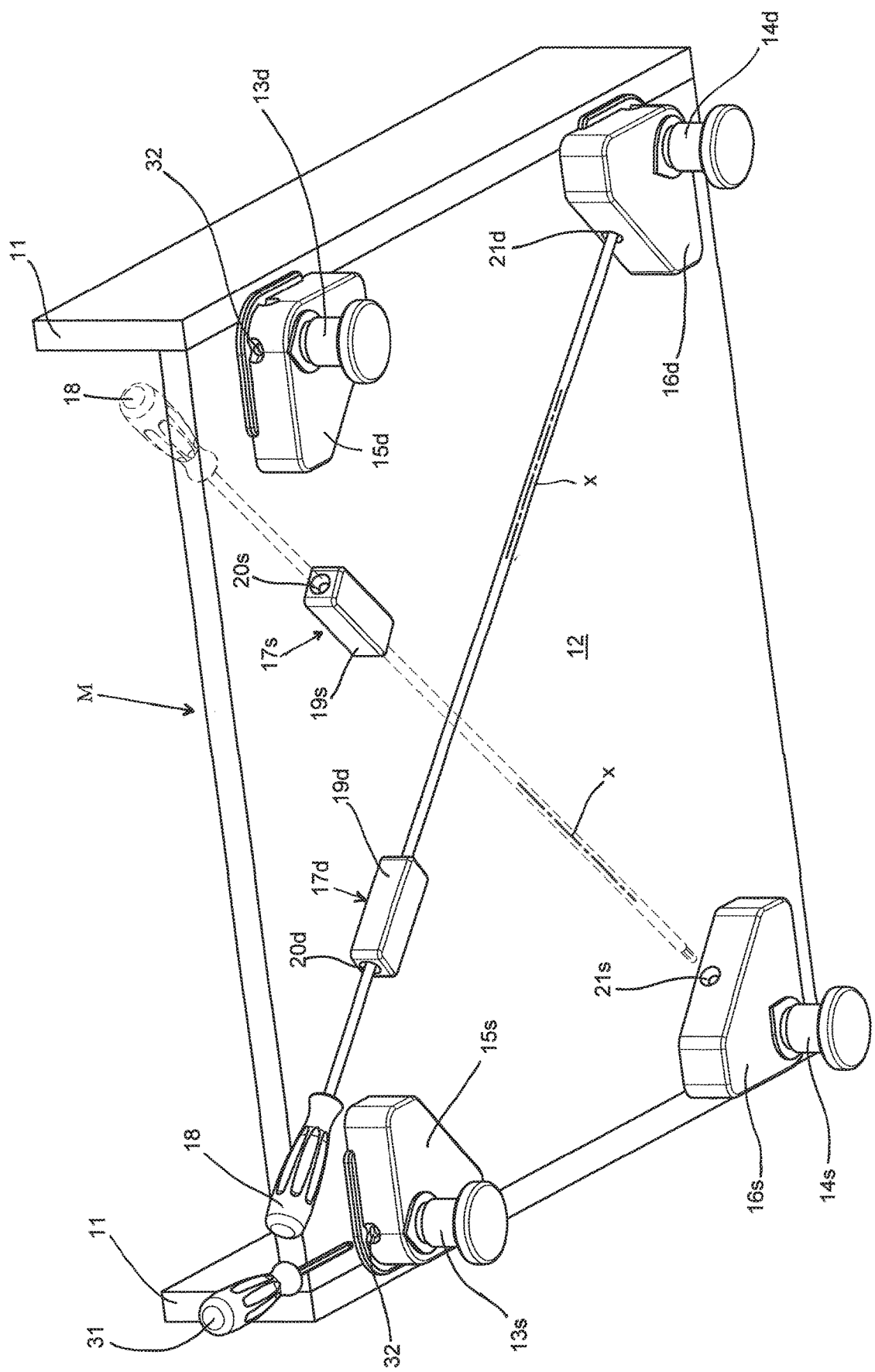
FIG. 1 is a perspective view illustrating a first example of a compact front adjustment system for leveling feet for furniture produced according to the invention, wherein a maneuvering tool is supported and guided by a specific unit not constrained to the front foot with only one access for reaching a single rear foot of a base for furniture, wherein said rear foot is provided with an adjustment mechanism.

With reference in general to the drawings, it can be observed that the figures partially illustrate a piece of furniture M, for example a piece of kitchen furniture (base), in which, in the example shown, shoulders 11 (sides) terminate in correspondence with a bottom 12, i.e. they do not reach the floor (not shown).

In other embodiments, the shoulders 11 can reach the floor and the bottom 12 can be at a greater height with respect to the edge of the shoulders 11 that rest on the floor.

As can be clearly seen from the drawings, the furniture (base) M is designed for resting on the floor using at least a pair of front feet 13d, 13s, right and left respectively, and at least a pair of rear feet 14d, 14s. Said pairs of front feet 13d, 13s and rear feet 14d, 14s are provided with respective attachments 15d, 15s and 16d, 16s to the bottom 12 of the furniture M itself, in an angular position. Said feet and attachments can be of a type well-known to skilled persons in the field, also incorporating an adjustment mechanism in height. Reference should be made, for example, to the above-mentioned prior patents.

As already mentioned, in this type of furniture, the space below the bottom 12 must be completely free and front access to the rear adjustable feet 14d, 14s may be impossible due to the limited distance between the floor and bottom 12 of the furniture.

With particular reference to FIG. 1 of the drawings, according to the present invention, respective supporting and guiding units 17d, 17s for a maneuvering tool 18 cooperate with said pair of rear feet 14d, 14s.

Said units 17d, 17s, are fixed to the bottom 12 of the furniture M (on the outer surface opposed to the floor, not shown) in intermediate positions between the above-mentioned front feet 13d, 13s.

In the embodiment of FIG. 1, the units 17d, 17s, consist of supporting and guiding elements 19d, 19s, having an elongated parallelepiped form (dowels), crossed by respective longitudinal pass-through holes 20d, 20s.

Characteristically, according to the invention, the longitudinal symmetry axis of said pass-through holes 20d, 20s coincides and is aligned with the symmetry axis X (it lies along the same axis X) of the holes 21d, 21s of the rear attachments 16d, 16s for access to the adjustment mechanism in height (not shown) of the respective rear foot 14d, 14s.

In this way, the adjustment in height of the rear feet 14d, 14s can be easily effected by introducing the maneuvering tool 18 into the longitudinal holes 20d, 20s and pushing it forwards until it is inserted inside the access holes 21d, 21s to the adjustment mechanism, as clearly illustrated in FIG. 1 of the drawings.

Figure 2:
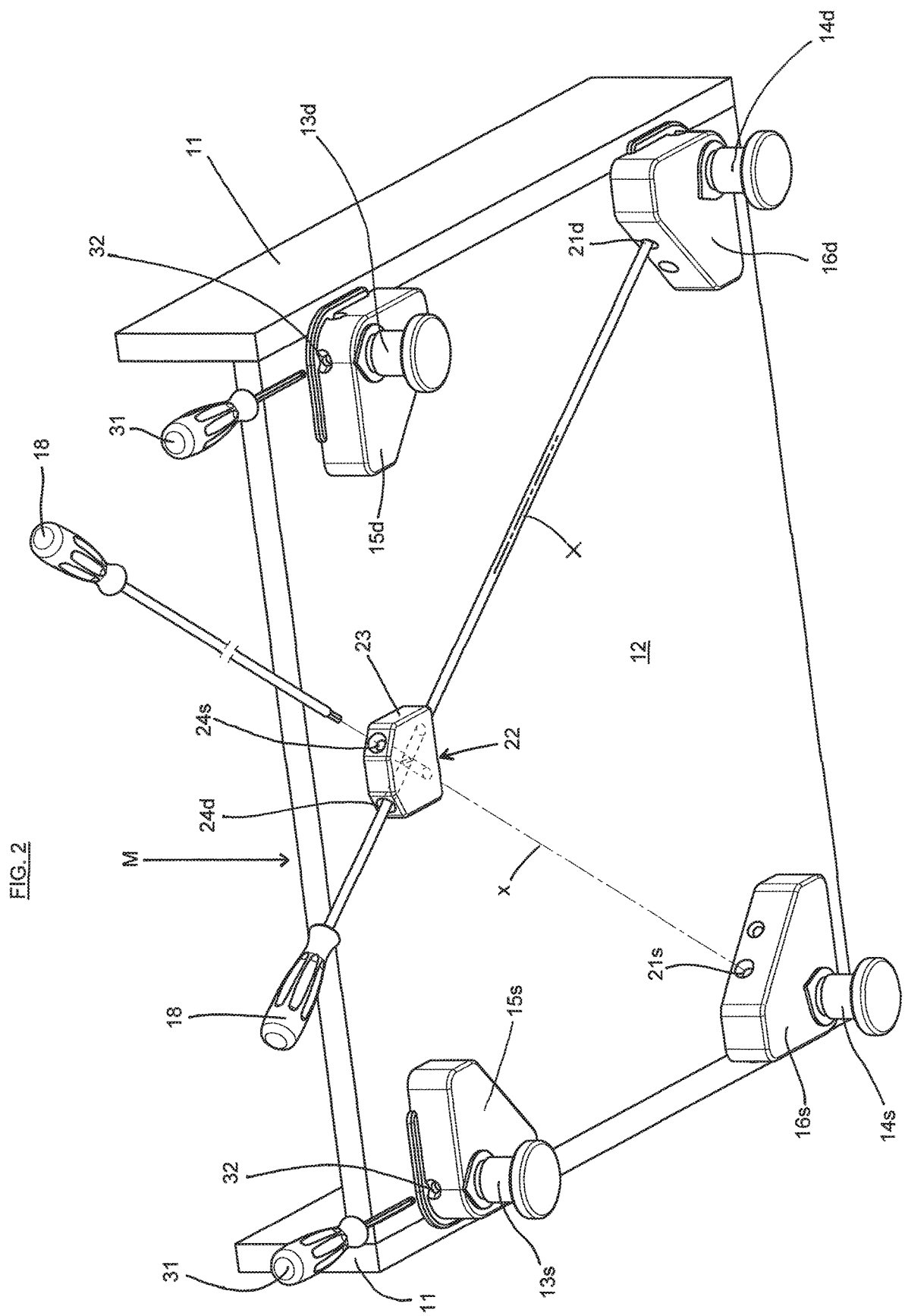
FIG. 2 is a perspective view illustrating a further example of an adjustment system according to the invention, wherein a maneuvering tool is supported and guided by a single unit not constrained to the front feet with two access points for reaching both the right rear foot and the left rear foot of a base, wherein both of said rear feet are provided with respective adjustment mechanisms.

In the embodiment of the invention of FIG. 2 of the drawings, a single supporting and guiding unit 22 for the maneuvering tool 18 is illustrated, said unit 22 is fixed to the bottom 12 in an intermediate position between the right and left front feet.

Said unit 22 consists of an element (dowel) generally prismatic 23 in which crossed pass-through holes (a pair) 24d, 24s are formed.

Also in this case, as in the embodiment of FIG. 1, the longitudinal symmetry axis of said pass-through holes 24d, 24s coincides and is aligned with the symmetry axis X (it lies along the same axis X) of the holes 21d, 21s of the rear attachments 16d, 16s for access to the adjustment mechanism in height (not shown) of the respective rear foot 14d, 14s.

The adjustment is effected as already explained with reference to FIG. 1.

Figure 3:
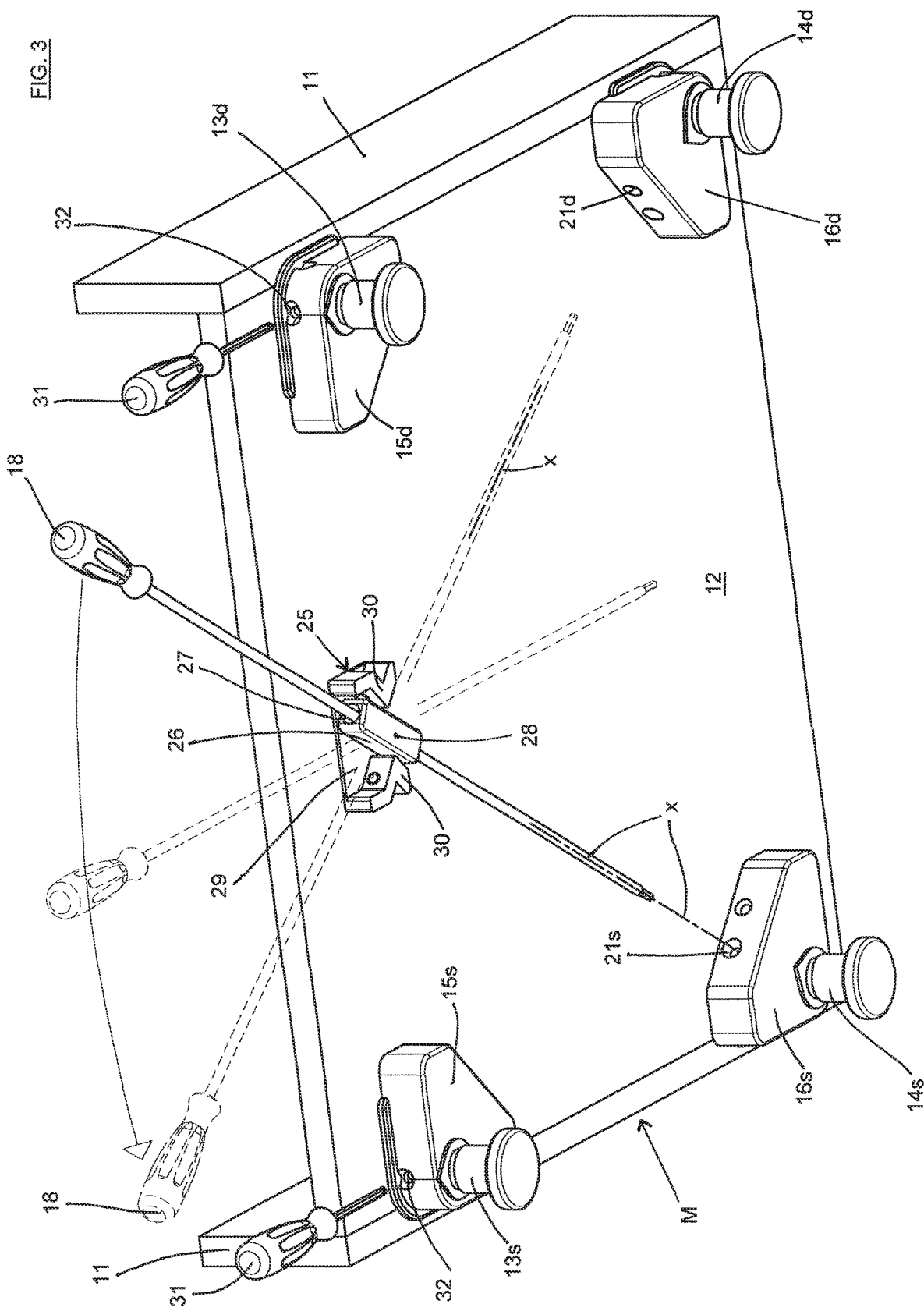
FIG. 3 is a perspective view of a third embodiment of the invention wherein a maneuvering tool is supported and guided by a single unit not constrained to the front feet with a single orientable access for reaching both the right rear foot and the left rear foot of a base for furniture, wherein both of said rear feet are provided with respective adjustment mechanisms.

In the embodiment of the invention of FIG. 3 of the drawings, a single supporting and guiding unit 25 for the maneuvering tool 18 is illustrated, said unit 25 is fixed to the bottom 12 in an intermediate position between the right and left front feet.

Said unit 25 consists of a supporting and guiding element 26 having an elongated parallelepiped form, crossed by a longitudinal pass-through hole 27.

Said element 26 is hinged in 28 to a base 29 which is fixed to the bottom 12.

In this way, the element 26 can be rotated between two terminal operating positions determined by a stop 30 of the base 29.

As can be clearly seen in FIG. 3, in said two operating positions, the longitudinal symmetry axis of said pass-through hole 27 coincides and is aligned with the symmetry axis X (it lies along the same axis X) of the holes 21d, 21s of the rear attachments 16d, 16s for access to the adjustment mechanism in height of the respective rear foot 14d, 14s.

The adjustment is effected as already explained with reference to FIGS. 1 and 2, but also causing, by means of the same maneuvering tool 18, the rotation around 28 of the element 26 in either of the two terminal operating positions to effect the adjustment of either the right rear foot, or the left rear foot.

The front feet 13d, 13s are also provided with an adjustment mechanism in height that can be manoeuvred by means of a maneuvering tool 31 through access holes 32. Also in this case, the adjustment mechanism in height can be of any type well-known to skilled persons in the field (also manoeuvrable acting directly on the base of the foot that rests on the floor).

The objective mentioned in the preamble of the description for providing an adjustment system that is both extremely economical and functional, has therefore been achieved.

The protection scope of the invention is defined by the following claims.

What is claimed is:

1. A compact front adjustment system for leveling feet for furniture (M) with a bottom (12) and shoulders (11), comprising:
a front right foot (13d) and a front left foot (13s) and a rear tight foot (14d), a rear left foot (14s), and at least one supporting and guiding unit (17d,17s; 22; 25);
wherein each of said rear feet (14d,14s) comprises an adjustment mechanism in height, which is accessible from outside the foot through respective holes (21d, 21s) and which is maneuvered by a maneuvering tool (18);

wherein a supporting and guiding unit (17*d*,17*s*; 22; 25) is assembled on said bottom (12) of the furniture (M) in an intermediate position between said front feet (13*d*,13*s*), wherein said supporting and guiding unit (17*d*,17*s*; 22; 25) has a plurality of pass-through holes (20*d*,20*s*; 24*d*,24*s*; 27) each having a longitudinal symmetry axis that coincides and aligned with a symmetry axis X of one of the holes (21*d*, 21*s*) of one of the rear feet for allowing said maneuvering tool (18) to access to the respective adjustment mechanism in a height of the respective rear foot (14*d*,14*s*) via the intermediate position between said front feet (13*d*,13*s*), wherein the intermediate position is limited to an area close to a front edge of the bottom (12) of the furniture (M) and is not constrained to said front feet (13*d*,13*s*): wherein said supporting and guiding elements (19*d*,19*s*; 23; 26) is shaped as a parallelepiped/prismatic dowel.

2. The compact front adjustment system according to claim 1, wherein said supporting and guiding unit consists of a pair of elements (19*d*,19*s*) fixed to the bottom (12) and each provided with a pass-through hole (20*d*,20*s*) from the plurality of pass-through holes.

3. The compact front adjustment system according to claim 1, wherein said supporting and guiding unit consists of a single element (23) fixed to the bottom (12) of the furniture and provided with a pair of crossed pass-through holes (24*d*,24*s*).

4. The compact front adjustment system according to claim 1, wherein said supporting and guiding unit consists of an element (26) that is moved between two operating positions, a first position in which said axis (X) is aligned with a first hole (21*d*) from the plurality of pass-through holes for access to the maneuvering mechanism of the right rear foot (14*d*), and a second position in which said axis (X) is aligned with a second hole (21*s*) from the plurality of pass-through holes for access to the maneuvering mechanism of the left rear foot (14*s*).

5. The compact front adjustment system according to claim 4, wherein said element (26) is hinged in (28) to a base (29) fixed to the bottom (12).

* * * * *